Oct. 2, 1962
A. C. McCOLL
3,056,438
SAW MILL CARRIAGE
Filed Oct. 3, 1960
4 Sheets-Sheet 1
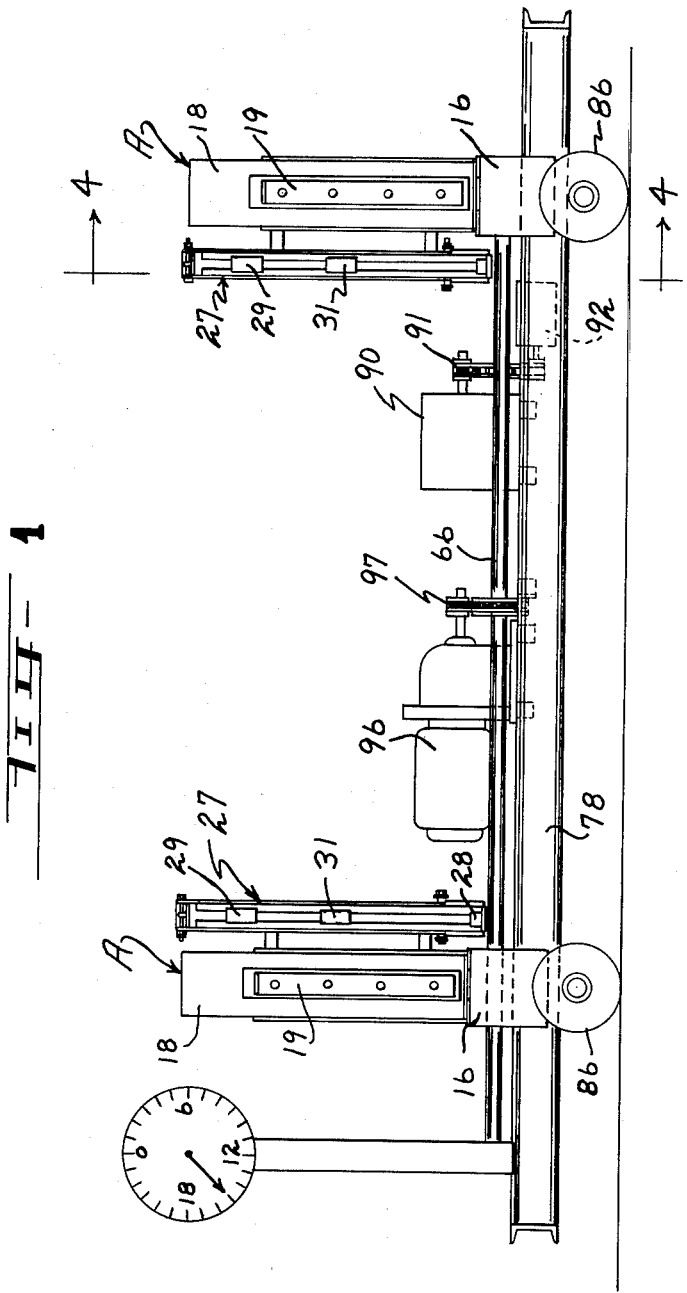
INVENTOR.
Allan C. McColl
BY Jennings, Carter & Thompson
Attorneys

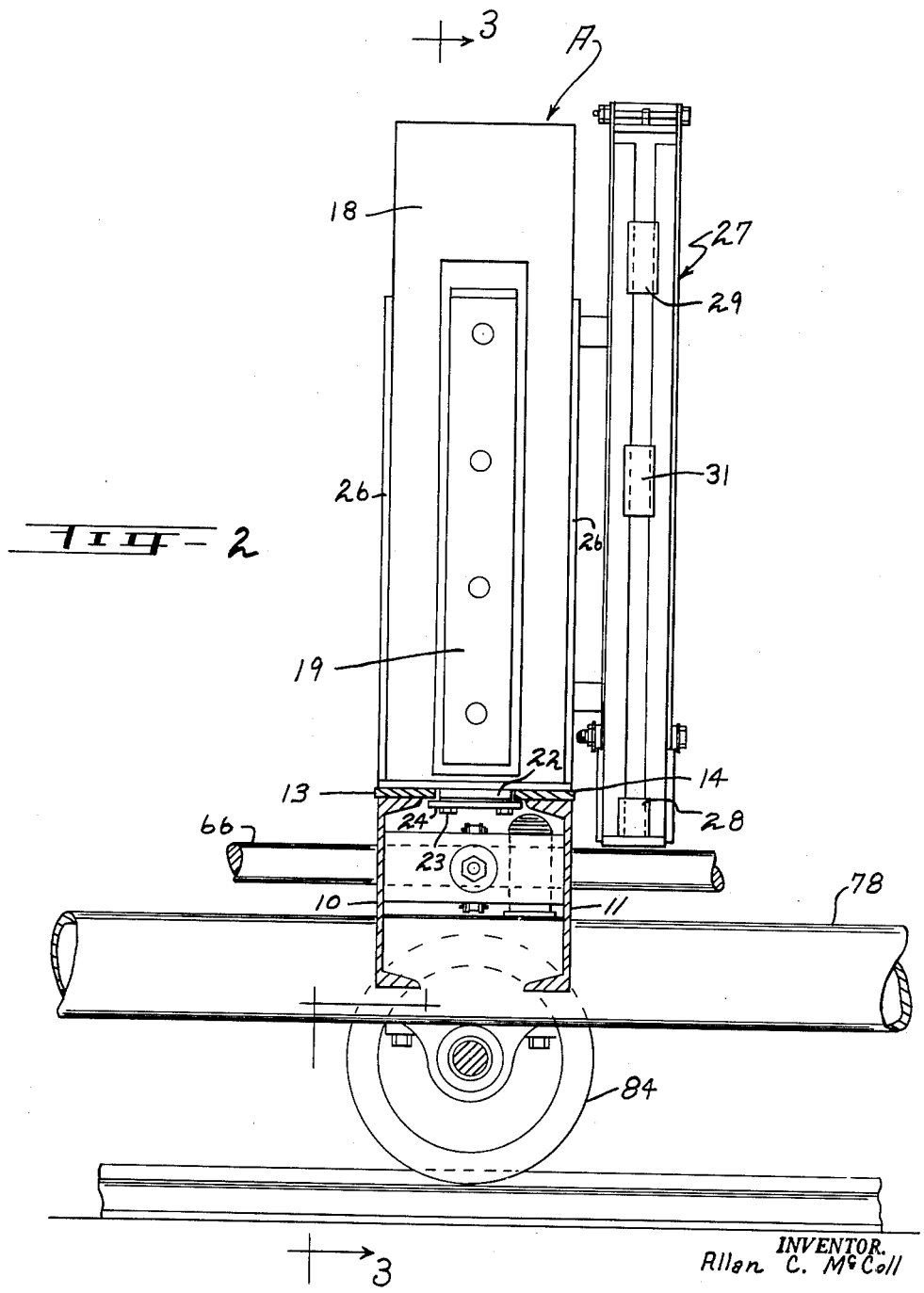

Oct. 2, 1962
A. C. McCOLL
3,056,438
SAW MILL CARRIAGE
Filed Oct. 3, 1960
4 Sheets-Sheet 3
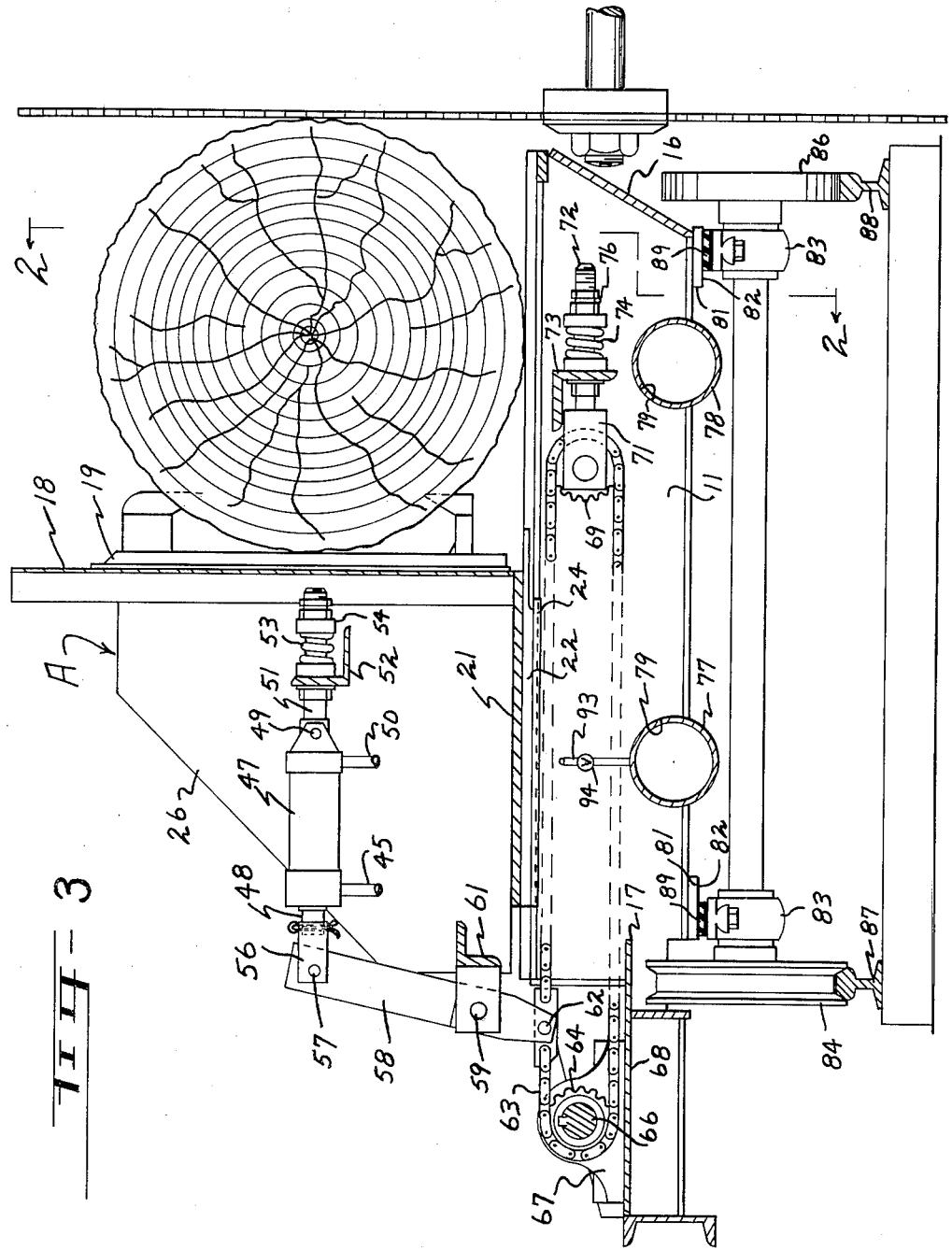
INVENTOR.
Allan C. McColl
BY
Jennings, Carter & Thompson
Attorneys

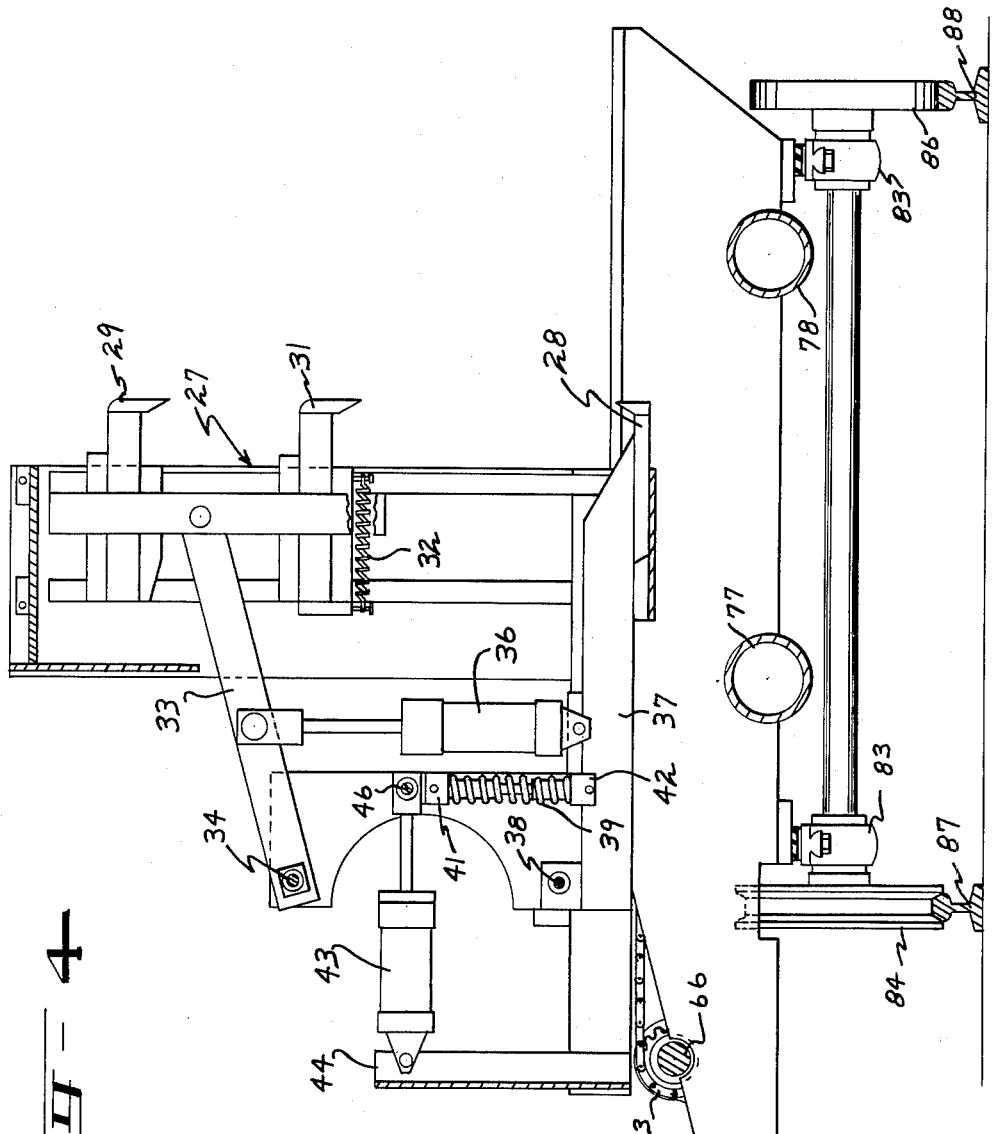

United States Patent Office 3,056,438
Patented Oct. 2, 1962

3,056,438
SAW MILL CARRIAGE
Allan C. McColl, Chattanooga, Tenn., assignor to The Wheland Company, a corporation of Tennessee
Filed Oct. 3, 1960, Ser. No. 59,910
3 Claims. (Cl. 143—118)

This invention relates to an improved construction for saw mill carriages and the like.

Heretofore, saw mill carriages have been fabricated by first building a main frame of structural members, including longitudinal members cross braced by other members. In order that the supporting wheels would all contact the rails on which the carriages run, it heretofore has been necessary to complete the frame and then to place the entire carriage as a unit on a planer or like machine, thereby accurately to machine the parts of the carriage to which the wheels were to be mounted. Since saw mill carriages may be as long as 40 feet and as much as 10 feet wide, such machining problems have been difficult and expensive and require a very large machine tool to carry out such operation. Further, in prior constructions, the supporting wheels have been placed under the frame without regard to whether they were beneath the points of maximum load. That is, insofar as I am aware the supporting wheels for running upon the rails have been placed at random points under the main frame of the carriage as distinguished from placing them under the load points. This has had a tendency to cause deflection in the carriage, tending to cause some of the supporting wheels either to carry less than their proportionate share of the load or to fail altogether to contact the rails throughout the travel of the carriage.

In view of the foregoing the prime object of my invention is to provide a saw mill carriage in which the necessity for machining the wheel supports after assembly of the entire carriage is eliminated, thereby greatly reducing the expense of manufacture and permitting the use of smaller machine tools.

Another object is to provide a saw mill carriage in which the bases for the knees and dogs are fabricated separately from each other as units, the machined pads for the wheel bearing blocks being carried directly on the bases and then the required number of base units being joined together by longitudinal members, thus providing a carriage which is extremely simple to manufacture and one which is properly aligned upon completion of the assembly.

Another object is to employ for at least one of the longitudinal members a hollow pipe or tube and to utilize such pipe or tube as a receiver for air under pressure for operating the several air pressure devices on the carriage. A further object is to provide a saw mill carriage in which the connections between the knees and set shaft, including the taper mechanisms, are resilient yet positive in operation, thereby greatly to reduce the log loading shocks on the entire knee and set shaft structure when logs are rolled onto the carriage as is customarily done in saw milling.

Apparatus illustrating features of my invention is shown in the accompanying drawings forming a part of this application in which:

FIG. 1 is a front elevational view of a saw mill carriage embodying my improvements;

FIG. 2 is a detail sectional view taken generally along line 2—2 of FIG. 3;

FIG. 3 is a cross sectional view taken generally along line 3—3 of FIG. 2; and,

FIG. 4 is a detail sectional view taken along line 4—4 of FIG. 1.

Referring now to the drawings for a better understanding of my invention, it will be seen that my improved carriage comprises what might be termed unitary or constructionally separate knee and dogs assemblies indicated generally by the letter A. That is to say, insofar as the longitudinal frame members of the carriage as a whole are concerned, it will presently appear that my improved carriage is made by constructing separately the entire units A and then in connecting them with longitudinal members to be described.

The bases for the knees may be formed of structural members such as channels 10 and 11 spaced apart longitudinally of the carriage as shown specifically in FIG. 2. On top of the members 10 and 11 are wear strips or plates 13 and 14. The base members 10 and 11 are braced at the forward lower side of the carriage by a plate 16 and on the rear lower side by suitable plates 17 (FIG. 3).

The knees are generally of standard construction and may embody the vertical member 18 which carries a knee wearing strip 19. Also, the knees embody a plate 21 which slides on the wear plates 13 and 14. Extending downwardly between the space formed by the adjacent inner edges of the wear plates 13 and 14 is a knee guide plate 22. Spanning the space between the wear plates 13 and 14 and secured to the plate 22 by bolts 23 is a knee retaining plate 24. The usual plate bracing 26 is provided to strengthen the knee.

Mounted on the sides of the knees are the dog assemblies indicated generally by the numeral 27. Thus, there may be a lower dog 28, and an upper dog 29. Likewise, I may provide the usual intermediate dog 31 biased outwardly in the framework by a spring 32 (FIG. 4). The dogs 29 and 31 may be moved to chucking position by means of a lever 33 pivoted to a suitable part of the framework at 34 and movable upwardly and downwardly by means of a double acting air cylinder 36 connected as illustrated in FIG. 4. It will be noted that the lower dog 28 is carried on the forward end of an arm 37. The arm 37 is pivoted at 38 between the side plates of the dog assembly housing. A compression spring 39 is mounted between a fixed block 41 fast on the frame of the dog assembly. Another block 42 carried on the arm 37 receives the other end of spring 39. Therefore, when cylinder 36 is actuated, the upper dog 29 or 31, as the case may be, first engages the log. During the initial movement downwardly of the arm 33 spring 39 prevents dog arm 37 from moving upwardly. However, as soon as the dog 29 or 31 is chucked, the lower dog 28 moves upwardly to engage and hold the underside of the log. It will be understood that the dogs are moved inwardly and outwardly by means of another air cylinder 43 pivotally connected to an upstanding frame member 44 and connected at 46 to a cross pin passing between the side plates of the dog assembly.

Referring now more particularly to FIG. 3 of the drawing, it will be seen that each knee embodies means for effecting taper. Thus, there is an air cylinder 47 having a movable piston rod 48. The cylinder is pivotally mounted at 49 to one end of a rod 51. The rod 51 passes slidably through an opening provided in a cross member 52 which is secured between the plates 26 of the knees. A compression spring 53 is adjustably held by nuts 54.

The piston rod has a bifurcated end 56 which is pivotally mounted at 57 to a link 58. The link in turn is pivotally mounted at 59 to a bracket 61 also carried by the plates 26.

The lower end of the link 58 is pivotally connected at 62 to the upper flight of a flexible member such as a chain 63. The chain 63 passes over a sprocket 64 fast on a set shaft 66, the shaft being mounted in suitable bearings 67 which are supported on a plate member 68 at the rear side of the carriage.

The other or forward loop of the chain 63 passes over an idler pulley 69. The pulley 69 is supported in a bracket 71 which carries a threaded pin 72 projecting therefrom. The pin 72 passes slidably through an opening in a bracket 73 mounted between the base members 10 and 11. A spring 74 is adjustably compressed by nuts 76.

From what has just been described it will be apparent that the entire knee moves in and out upon rotation of the shaft 66 and that upon admitting air under pressure to the cylinder 47 the knees may be properly adjusted for taper. Furthermore, it will be apparent that the entire base frames as well as the knees and the associated taper, knee and dog mechanisms may be fabricated separately.

The assembly of the carriage is completed by joining the desired number of knee and dog assemblies by means of a pair of longitudinally extending members 77 and 78. That is, the members 10 and 11 may have semi-circular openings 79 cut in the bottom surfaces thereof thus to fit down over the longitudinal members 77 and 78 and are welded in place.

It will be noted that I provide pads 81 adjacent the ends of the bases. These may be welded in place. Subsequent to welding, and after completion of the base members themselves, and prior to mounting the knees and dogs thereon, I prefer to machine the lower surfaces 82 of the pads so that these surfaces lie in a common horizontal plane. Therefore, when the wheel bearing blocks 83 are put in place I am assured that the wheels 84 and 86 will contact the respective rails 87 and 88 throughout the entire travel of the carriage. Preferably, I employ rubber shock absorbing blocks 89 between the pads and the wheel bearing blocks.

As shown particularly in FIG. 1, I may mount on the carriage an air compressor indicated diagrammatically at 90. The air compressor may be driven through a chain 91 from an electric motor or other prime mover 92 provided on the carriage. Air from the compressor may be supplied through a line 93 leading to one of the longitudinal tie members, for instance member 77, which is made air-tight, so that the member 77 acts as a reservoir or receiver for a supply of air under pressure for the several cylinders. I may provide a check valve 94 (FIG. 3) in the line 93. The air from the receiver is supplied to the cylinders through suitable lines 45 and 50 and control valves, not shown. Likewise, in FIG. 1 I illustrate diagrammatically a reversible electric motor 96 which drives the set shaft 66 through a suitable positive type drive such as a chain 97.

From the foregoing, it will be apparent that I have devised an improved construction for saw mill carriages. My invention is particularly characterized by the fact that the bases for the knees and dogs may be fabricated by welding or the like, the pads 81 welded in place, and these relatively small sub-assemblies then being placed in a suitable tool to machine the surfaces 82 of the pads to a common horizontal plane prior to assembly of the entire carriage. Thus, I have greatly reduced the cost of fabrication by this means.

It will also further be apparent that the fluid pressure cylinders 47 together with the springs 53 and 74 form resilient connections between the set shaft and the knees. These eliminate the usual shocks imposed on the knees when a log is rolled onto the carriage.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a saw mill carriage, a plurality of base members, a knee and dog assembly on each base member, means to move the assemblies relative to the base members, a truck directly connected to and directly supporting each base member adjacent the ends thereof, a pair of longitudinally extending support members rigidly connected to the lower portions of the base members and extending therebetween, at least one of said longitudinal support members being of a tubular air-tight construction thereby to hold a supply of air under pressure, air pressure devices on the carriage operatively connected to the assemblies, and pressure transmitting connections from said air-tight support member to said air pressure devices.

2. In a saw mill carriage, a plurality of bases for supporting knee and dog assemblies adapted for sliding movement on the bases, a set shaft supported by the bases, taper adjustment mechanisms for the knees of said assemblies, said mechanisms embodying chains passing over and positively driven from the set shaft, air pressure devices having relatively movable parts one of which is operatively connected to the knees to move the knees relative to the bases, and links pivotally supported intermediate their ends to the bases, the lower ends of the links being operatively connected to the chains for actuation thereby and the upper ends of the links being connected to the other movable part of the air pressure devices whereby upon rotation of the set shaft the knees are actuated through the links.

3. In a saw mill carriage, a plurality of bases for supporting knee and dog assemblies adapted for sliding movement on the bases, a set shaft supported by the bases, taper adjustment mechanisms for the knees of said assemblies, said mechanisms embodying chains passing over and positively driven from the set shaft, air pressure devices having relatively movable parts one of which is operatively connected to the knees to move the knees relative to the bases, links pivotally supported intermediate their ends to the bases, the lower ends of the links being operatively connected to the chains for actuation thereby and the upper ends of the links being connected to the other movable part of the air pressure devices, said chains passing over sprockets on the set shaft and idler sprockets, and means resiliently supporting the idler sprockets from their associated bases, whereby log loading shocks on the knees are absorbed by the air pressure devices and said resilient idler sprocket support means.

References Cited in the file of this patent

UNITED STATES PATENTS

| | | |
|---|---|---|
| 117,936 | Selden | Aug. 8, 1871 |
| 335,168 | Wilkin | Feb. 2, 1886 |
| 423,086 | Scott | Mar. 11, 1890 |
| 468,733 | Stinebring | Feb. 9, 1892 |
| 1,404,820 | Willette | Jan. 31, 1922 |
| 1,832,908 | Langill et al. | Nov. 24, 1931 |
| 1,846,621 | Tanner | Feb. 23, 1932 |
| 2,551,824 | Coote | May 8, 1951 |
| 2,661,779 | Saunders | Dec. 8, 1953 |

FOREIGN PATENTS

| | | |
|---|---|---|
| 93,539 | Sweden | Dec. 2, 1938 |